United States Patent [19]
Nishimura et al.

[11] Patent Number: 5,628,973
[45] Date of Patent: May 13, 1997

[54] LITHIUM CELL TREATING METHOD AND LITHIUM CELL TREATING APPARATUS

[75] Inventors: Katsunori Nishimura; Hidetoshi Honbo; Akihiro Gotoh, all of Hitachi; Mamoru Mizumoto, Katsuta; Tatsuo Horiba, Hitachi, all of Japan

[73] Assignee: Hitachi, Ltd., Tokyo, Japan

[21] Appl. No.: 220,220

[22] Filed: Mar. 30, 1994

[30] Foreign Application Priority Data

| Apr. 1, 1993 | [JP] | Japan | 5-075443 |
| Sep. 20, 1993 | [JP] | Japan | 5-232778 |

[51] Int. Cl.[6] .......................... C01D 15/02; C01D 15/00; H01M 6/50
[52] U.S. Cl. ............................. 423/179.5; 429/49
[58] Field of Search ..................... 423/179.5; 429/49

[56] References Cited

U.S. PATENT DOCUMENTS

| 4,448,859 | 5/1984 | Bishop et al. | 429/49 |
| 4,637,928 | 1/1987 | Zajac, Jr. et al. | 423/179.5 |
| 5,015,541 | 5/1991 | Evans | 429/49 |
| 5,352,270 | 10/1994 | Shackle | 423/179.5 |
| 5,491,037 | 2/1996 | Kawakami | 429/49 |

FOREIGN PATENT DOCUMENTS 9407277  3/1994  WIPO.

OTHER PUBLICATIONS

Database WPI, Week 9309, 1993, Derwent Publications Ltd., London, GB AN 93-071401.
Extended Abstracts, vol. 81, No. 2, Oct. 1981, Pennington, New Jersey, pp. 46–47.

*Primary Examiner*—Janet C. Baxter
*Attorney, Agent, or Firm*—Antonelli, Terry, Stout & Kraus, LLP

[57] ABSTRACT

A treating fluid is in contact with a negative electrode containing lithium of a lithium cell under a first condition to react a surface portion of the negative electrode, and a treating fluid is in contact with lithium existing inside an article formed on the surface of the above-described negative electrode under a second condition. The cells can be effectively treated under safety condition to collect either the valuable substances, or the cell constructive components.

16 Claims, 4 Drawing Sheets

F I G. 3
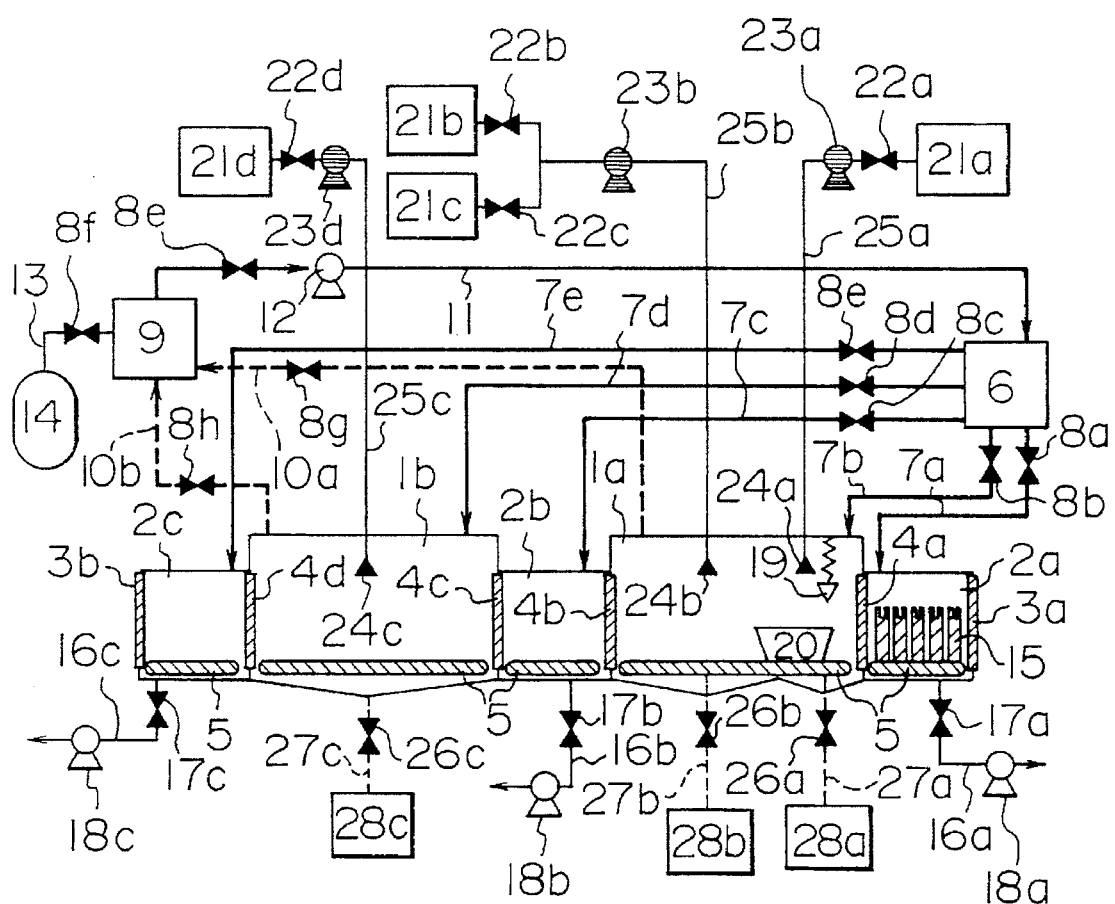

LITHIUM CELL TREATING METHOD AND LITHIUM CELL TREATING APPARATUS

BACKGROUND OF THE INVENTION

The present invention relates to a treating method and a treating apparatus of a used cell or battery, and to a method and an apparatus for treating a lithium cell.

Demands of cells or batteries are increasing year by year. Effective utilization of chemical substances employed in cells or batteries, and also problems of environmental pollution caused by cells or batteries must be considered. For example, lithium and transition metal element and the like employed in a lithium cell are valuable substances to be reused. Rechargeable lithium secondary cells are extensively used year after year as backup power sources for computers and power sources for compact home appliances. Other demands as power storage power sources, or power sources for automobiles may have a bright future.

High energy type cells typically known as lithium cells employ electrolytic solution containing negative-electrode activated substances such as reaction-activated alkali metals, and also substances reactive to water. And most of positive electrodes include great deal of reusable metal component. As a consequence, when used cells are dismantled, it is desired to propose such a treatment method that cell-activated substances, or activated substances such as electrolytic solution are brought into inert substances under safety states, and reusable valuable chemical substances are collected. However, no confirmation could be made about any method for treating a large number of cells such as used lithium cells in an industrial scale, or any invention related to a cell treating apparatus.

To suppress environmental pollution caused by chemical substances contained in used cells, or used batteries, and to improve utilization of resources employed in these cells, cell treating methods as well as methods for reusing cell materials have been required for long time.

Generally speaking, a specific care should be taken to handle such high-energy density type cells as lithium cells, because these cells contain cell activated substances or electrolyte with extremely high chemical reactive characteristics. For instance, carbon compounds into which a lithium metal, a lithium alloy, and lithium have been inserted by electrical and chemical methods, are utilized in a negative electrode of a lithium cell, and therefore any of these compounds extremely reacts to water, thereby producing hydrogen gas. Also in the above-described cells, there are employed other than the above-mentioned alkali metal, either valuable substances such as reusable transition metals, or electrolytic solution capable of probably producing poison gas. As an example of the valuable substances, there are $LiCoO_2$, $LiNiO_2$, $V_2O_5$ and the like, which correspond to an activated substance of a positive electrode for a lithium cell. As an example of the electrolytic solution, there are $LiPF_6$, $LiAsF_6$ and the like, which correspond to the typical electrolyte of the lithium cell. The electrolytic solution containing these electrolyte mediums is resolved with being cooperative to water, thereby producing $PF_5$, $AsF_5$ and the like having strong poison. As a consequence, method/means capable of safely treating cells in a high efficiency are required.

SUMMARY OF THE INVENTION

Thus, an object of the present invention is to provide a cell treating method and a cell treating apparatus with safety and high efficiencies.

The present invention is so featured that a cell constructed of a positive electrode and a negative electrode containing lithium via electrolyte is in contact with treating fluids which react to lithium under a first condition and a second condition.

It is also featured that the above-described negative electrode containing lithium is in contact with the first treating fluid reacting to lithium under the first condition, whereby a surface portion of the negative electrode will react, and lithium existing inside the reacted material, i.e. product, formed on the surface of the negative electrode by means of the first treating fluid is in contact with the second treating fluid reacting to lithium under the second condition.

A cell treating method for adding a treating fluid to a cell manufactured by providing a positive electrode and a negative electrode containing lithium via electrolyte within a cell vessel, is characterized by comprising step 1 for exposing the negative electrode containing lithium, step 2 for separating the electrolyte from the cell, and a step 3 for causing the treating fluid reacting to lithium to be in contact with the above-described negative electrode. In this treating method, it is preferable to further comprise step 4 for collecting at least one of the used treating fluid, the used electrolyte, and the used cell constructive parts.

The step 3 is so featured that the negative electrode containing lithium is in contact with the first treating fluid reacting to lithium under the first condition, whereby the surface portion of the negative electrode will react, and lithium present within the product formed on the surface of the negative electrode is in contact with the second treating fluid reacting to lithium.

As to the below-mentioned subjects, it is preferable to have such a relationship as the first condition<the second condition:

A relationship in concentration about of a reaction substance which reacts to the negative electrode containing lithium within the respective treating fluids.

A relationship in water content within the treating fluid. For instance, a relationship in a concentration of water within the treating fluids.

A relationship in temperatures of the treating fluids.

A relationship in reaction velocity of reactions between the negative electrode containing lithium and the treating fluids.

A relationship in amounts of gas produced by causing the negative electrode to be in contact with the treating fluids.

A producing rate of hydrogen gas produced when the treating fluid is in contact with the negative electrode containing lithium. This gas producing rate may be measured by measuring, for example, an amount of hydrogen produced per unit time, or may be judged based on hydrogen concentration and so on.

The above-described second condition is featured that the product formed on the surface of the negative electrode under the first condition is washed, and lithium present within the product is in contact with the treating fluid reacting to lithium. The washing process may be carried out by, for instance, melting the product formed on the surface, or peeling off the product from the negative electrode.

In the above-described step 3, the treating fluid is in contact with the negative electrode and this treating fluid may be stirred.

In the above-described step 1, at least one of the above-explained cell vessel and positive electrode is separated from the cell, so that the succeeding steps may be effectively executed.

As the step 2, either the cell, or the constructive parts of the cell is in contact with a fluid for cleaning electrolyte. For instance, after the cell, or the constructive part thereof is dipped into the cleaning fluid, or the cleaning fluid is supplied to this cell, or the constructive part thereof in order to be in contact with it, the cleaning fluid is collected to separate the electrolyte from the cell.

The above-explained treating fluid may contain one or more sorts of reaction substance which react the negative electrode containing lithium. The treating fluid comprises at least one of an organic fluid, water, and a mixture thereof. As the organic fluid preferably comprises one or more alcohols whose carbon number is smaller than, or equal to 5, in which ethanol, propanol and butanol are included. Propanol and butanol are more preferable.

The above-described treatment is performed in such a featured manner that this treatment is carried out either in inert gas, or in a dry gas atmosphere having a moisture content than that of air.

Furthermore, based upon at least one of information about temperatures, heating amounts, infrared, gas compositions, and pressure, the supply amount of at least one of the above-explained electrolyte cleaning fluid, treating fluid, inert gas, and dry gas may be increased/decreased, or stopped. At least one of compositions of the treating fluid, inert gas, and dry gas may be adjusted.

For instance, while monitoring an amount of production of hydrogen, the compositions of the treating fluid to be supplied, or the supply amount of the treating fluid may be controlled to achieve a predetermined reaction condition, so that lithium contained in the negative electrode may be treated.

Also, the present invention is characterized by comprising at least a treating chamber having supply means for supplying an inert gas or a dry gas whose moisture content is lower than that of air, and treating means within the treating chamber, for contacting more than two sorts of treating fluids reacting with lithium to the negative electrode of a lithium cell. Alternatively, the present invention is characterized by comprising more than two treating means within the treating chamber, for contacting at least one sort of treating fluid reacting to lithium to the negative electrode of the lithium cell.

Concretely speaking, the present invention is characterized by comprising a chamber having supply means for supplying an inert gas or a dry gas whose moisture content is lower than that of air; the treating chamber being connected via means for keeping gas atmosphere of the treating chamber to a preparing chamber equipped with an input/output port for a cell or a cell constructive part, and both the treating chamber and the preparing chamber including transporting means of the cell or the cell constructive part; resolving means for exposing a negative electrode containing lithium from a lithium cell along the transporting means within the treating chamber, the lithium cell being constructed of a positive electrode and the negative electrode containing lithium; separating means for separating electrolyte by contacting the cell to a fluid for cleaning electrolyte; and treating means for contacting the exposed negative electrode to a treating fluid reacting with lithium under more than two sorts of conditions.

The treating means is featured that the treating means includes a supplying port of a fluid reacting to lithium and a exhausting port of the fluid, provided in a downstream of the supplying port, the supplying port is communicated to a tank for storing a fluid reacting to lithium via either a switching valve for controlling the supply amount of the fluid from the tank, or a flow amount controller, and the exhausting port is communicated with a storage unit for the used liquid which has been collected at the exhausting port. At least one piece of the above-described tank is provided into which at least one sort of organic fluid, water, and mixture thereof is stored.

The supplying port is installed from a bottom surface of the treating chamber via a predetermined space, and the exhausting port is provided at a lower position than that of the supplying port. Preferably, more than two sets of treating means are employed. Also, more than two sets of treating means are arranged in a series form with respect to the transporting means.

It above-described gas atmosphere keeping means may employ, for instance, a port, or an air curtain on which a switching means is provided.

Furthermore, the present invention is characterized in that at least one sensor is provided at a preselected place within the treating chamber, and a controlling apparatus is provided which selects and controls at least one of supply component compositions and supply amounts for the inert gas, dry gas, liquid to clean electrolyte, and liquid reacting to lithium in response to information from the sensor. An inert substance and the like are separately stored, and the inert substance maybe supplied when the sensor senses an extraordinary condition.

The above-explained sensor may sense at least one of various types of information about temperatures, heating amounts, infrared, gas compositions, and pressure. The sensor may be properly selected from such sensors capable of sensing physical and chemical conditions of a cell.

The above-described control apparatus is characterized by comprising a calculation control unit for calculating information derived from the sensor, a memory unit for storing therein either past calculated data, or separately inputted data, and a control unit for comparing the value calculated by the calculating control unit with the data stored in the memory unit, thereby controlling at least one of supply amounts and supply component compositions with respect to more than one of the above-described inert gas, dry gas, liquid to dissolve electrolyte, and liquid reacting to lithium. Preferably, at least one of measurement data, calculation program, calculation data of the sensor is stored in the memory unit.

The cell treating apparatus, according to the present invention, has such a construction that the preparing chamber capable of supplying either the inert gas or the dry gas is coupled to the treating chamber for treating the activation substances of the cell under the inert gas or the dry gas atmosphere whose moisture content is lower than that of air. In the cell treating chamber, the fluid supplying system of the treating fluid is connected to the fluid exhausting system thereof. Since the inflammable gas such as hydrogen gas and the poison gas such as $PF_5$ are produced while treating the cell, the gas exhausting system is installed together with the gas supplying system. To transport the cells and the cell constructive parts between the treating apparatus and the outside field, and/or within the treating apparatus, the gas atmosphere keeping means within the respective chambers are provided between the preparing chamber and the outside field of the treating chamber, and between the adjoining preparing chambers and the treating chamber. For instance, either a switching plate, or a transporting port is employed. When the switching plate is utilized, the supplying system of the dry gas and the exhausting system thereof, which have valves, are required. When the transporting port is used, a method for continuously passing the dry gas and the like within the preparing chamber is employed. When the cell is entered from the outside field into the treating apparatus, or when the cell is transported among the treating chambers for the different gas atmospheres, it is possible with such a basic structure to keep the gas atmospheres of the treating chambers.

Next, a description will be made of the inert treating process for the used cells with employment of the above-explained treating fluid and treating apparatus for cells. As a concrete example, the cell treating method of the present invention comprises step 1 for exposing the negative electrode of the cell; step 2 for separating either the electrolytic fluid, or the solid electrolyte from the cell; step 3 for contacting the treating fluid to the negative electrode; and step 4 for collecting the disposal treating fluids, the electrolyte fluid or solid electrolyte the cell constructive parts, and the disposal members thereof.

At the step 1, the lithium cell may be completely discharged by previously connecting the positive polarity terminal of this lithium cell via a resistor or the like to the negative polarity terminal thereof. Furthermore, the lithium cell is transported to the preparing chamber of the cell treating apparatus according to the present invention, in which air present in this chamber is substituted by dry gas and the like. Subsequently, the lithium cell is transported from either the switching plate, or the transporting port provided between the preparing chamber and the treating chamber, into the treating chamber of the lithium cell. Next, a selection is made of a method for destroying the vessel of the lithium cell, depending upon the size of the lithium cell to be treated. In case of a small-sized cell, this cell may be dipped into an acid solution to corrode the cell vessel, and/or this cell may be mechanically crashed by employing a hammer crusher. In case of a large-sized cell, this type of cell may be destroyed in such a manner that the upper portion of the cell vessel is cut by a diamond cutter, to take out the cell constructive parts such as the electrodes from the vessel. When the electrodes of the large-sized cell are crashed by a cutter mixer, the time period required for the step 3 may be shortened (will be discussed later).

In the step 2, the electrolyte fluid or the solid electrolyte existing in the cell vessel, and the electrolytic fluid soaked in the separator can be collected. The electrolytic fluid remaining in the vessel can be collected by way of the disposal fluid exhausting system connected thereto. The electrolytic fluids attached to the cell vessel, the cell, and the separator may be cleaned by inert organic solvent such as benzen and the hexane, and then the resulting cleaning fluids may be collected from the disposal fluid exhausting system. When the electrolytic fluid directly collected, and the electrolytic fluid collected by the cleaning process, are separately collected from the different exhausting systems, it is useful to reduce reuse cost of the electrolytic fluid at the step 4 (will be discussed later).

In the step 3, the negative electrode is treated by using the treating fluid. As examples of usable treating fluid, there are alcohol such as ethanol, methanol, and propanol, a mixture fluid of alcohol and water, and water. These treating fluids react with the negative-electrode activated substances such as carbon containing a lithium metal, a lithium alloy, and lithium. When the water containing composition of the treating fluid is increased, reactive characteristic thereof becomes high. When a large quantity of lithium metals and compounds thereof are treated at once, there is a risk that a large amount of hydrogen may be produced due to reaction between lithium and alcohol even when only alcohol is used. In this case, mixture of above-described lower alcohol and the inert organic solvent to lithium is used so as to reduce the reactive characteristic of alcohol with respect to lithium. As the above-described inert organic solvent, there is hydrocarbon having more than 5 carbon numbers such as pentane, hexane, and benzene.

The treating fluid is conducted from the fluid supplying system, and the negative electrode is contacted with this treating fluid. Various methods for dipping the negative electrode into the treating fluid, for spraying the treating fluid toward the negative electrode in a spray shape, or for applying the treating fluid to the negative electrode may be utilized. When alcohol is first in contact with the negative electrode, lithium alcoholate is solved into a liquid phase, and a portion of this solved lithium alcoholate is deposited on the surface of the negative electrode. Gradually, the surface of the negative electrode is covered with the alcoholate deposited layer. The treating liquid is either heated, or stirred, thereby solving or separating the above-described alcoholate layer into or from the liquid phase, so that it is possible to prevent that the treating fluid is reacted with the negative-electrode activated substance located within the negative electrode, which is not yet reacted. As other means, either water, or a water/alcohol solution having a large water containing amount is attached to the negative electrode, and an alcoholate layer covering the negative electrode is solved, whereby resolving reaction of the negative-electrode activated substance which has no yet been reacted, is emphasized. A decomposition velocity of the negative-electrode activated substance may be controlled within a proper range by adjusting the temperature and the stirring rate of the treating fluid, and also the water containing amount of the treating fluid. As a result, the cell treating time may be shortened.

When a lithium cell is treated, it is preferable to employ such a cell treating apparatus that a plurality of treating chambers having the supplying ports and the exhausting ports for the treating fluid are alternately coupled to the preparing chambers. After the activated substances of the lithium cell have been decomposed in a treating chamber, the decomposed cell is moved to the adjoining treating chamber. Subsequently, all activated substances are decomposed by employing the treating fluid with a stepwise high reactive characteristic. Also even when source of the treating chambers are segmented, a plurality of fluid supplying ports and fluid exhausting ports are mounted on the segmented treating chambers, and the treating times of the cell within one treating chamber are increased, the cell treating time period maybe shortened. Gas atmospheres in the respective treating chambers are preferably dried up to the water concentration of the treating fluid to be used.

The used disposal treating fluid is exhausted from the treating chamber by the liquid exhausting system and then stored into a disposal treating fluid storing vessel. Hydrogen gas produced during the treatment of the negative electrode is preferably exhausted together with the dry gas existing in the treating chamber from the treating chamber by the gas exhausting chamber. A gas separator is installed in the gas exhausting system to separate hydrogen gas from inert gas, so that both of the hydrogen gas and the inert gas may be reused. When the electrolytic fluid containing $LiPF_6$ and $LiAsF_6$ is decomposed, such a treating fluid that water is diluted by alcohol is used. When the above-described electrolyte is reused, the separator is cleaned by the inert organic solvent such as benzen and hexane, and the electrolyte may be collected by vaporing it.

In the step 4, the treated cell constructive parts are derived from the preparing chamber located at the end portion of the cell treating apparatus, and the heavy metals may be reused by way of the previously established melting refinery method. From the collected electrolytic fluid and disposal treating fluid, the electrolyte such as $LiPF_6$ and $LiAsF_6$, the poison elements such as As, and the lithium metal may be collected. The cost to collect the valuable substances from the used treating fluid is influenced by concentrations of subjective substances contained in the disposal fluids exhausted from the cell treating apparatus. For instance, there is a case that the lower the containing concentration of the subjective substance becomes, the higher the collecting cost by the condensing process is increased. In accordance with the cell treating apparatus of the present invention, the disposal treating fluids exhausted from the respective treating chambers are separated and collected by employing the different disposal treating fluid exhausting systems, and the condensing process is performed only to the treating fluids containing the valuable substances at lower concentrations, so that the valuable substances can be collected from all the disposal treating fluids at lower cost. Also, depending upon the sorts of valuable substances, only the disposal fluids with high densities may be reproduced and treated, and the remaining disposal fluids may be treated by the normal disposal method. As described above, according to the cell treating apparatus of the present invention, the disposal treating fluids of the valuable substances with the different concentrations can be separately collected, whereby the cost of the reproducing process for the valuable substances can be reduced.

When the above-described cell treating steps would be automatically performed, the cell treatment could be performed at high efficiencies and also safety matters about the cell treatment could be improved. When such a driving type transporting machine as a belt conveyer would be provided in the preparing chamber and the treating chamber, transportations of cells could be easily performed between the preparing chamber and the treating chamber. When there would be provided a switching valve, or a flow rate controller for controlling the supplying amounts and the exhausting amounts of the treating fluid and gas; sensors for measuring pressure, temperatures, heating amounts, infrared, and gas compositions such as hydrogen concentration within the treating chamber; and also a controlling apparatus for controlling the flow rate controllers of the treating fluid and gas in response to the conditions of the treating chamber monitored by the sensors, the gas atmospheres within the cell treating apparatus could be automatically maintained, and also the supplying amount of the treating fluid could be automatically controlled. The flow rate controller and the like are provided on the intermediate portions of the treating fluid supplying tube and the treating fluid exhausting tube, which are connected to the preparing chamber and the treating chamber of the cell treating apparatus. The sensors are installed inside the treating chamber, and a temperature sensor, an infrared sensor, or a hydrogen sensor may be employed as these sensors. The measurement data about the temperature distribution, and hydrogen concentration within the treating chamber are transferred from the sensors to the controlling apparatus. For example, in the controlling apparatus, the information derived from the sensors is analyzed by the calculation processing unit and the controlling unit, the flow rate controller is operated in response to the analyzed measurement data, so that the supplying amount of the treating fluid, or the inert gas, the composition thereof, and the exhausting amount thereof are adjusted. A memory for storing therein the past data, the separately inputted data, and the program may be provided. Then, the flow rate controller may be operated by comparing the supplying amount of the treating fluid or the dry gas with the exhausting amount thereof, whereby the supplying amount and the exhausting amount of the treating fluid or the dry gas maybe adjusted. When rapid decomposition reaction happens to occur during the treating process of the cell, the conduction of the treating fluid may be instantaneously interrupted. Also, such inflammable gas as hydrogen gas which is excessively produced may be quickly exhausted from the cell treating apparatus. Moreover, a failure occurred during the cell treating process may be prevented in advance by previously storing the measurement data acquired before and after the cell treatment in the past into the memory unit of the calculation controller, by predicting rapid reaction occurred between the activated substances of the cell and the treating fluids based upon comparisons between the present measurement data and the past measurement data, and by controlling the supplying amounts of the treating fluids and the dry gas, and the exhausting amounts thereof.. The operations of the cell treating apparatus could be automated by incorporating such a control system into the cell treating apparatus, with the result that the decomposition process of the cell may be performed at higher efficiencies under safety conditions.

As described above, with employment of the apparatus according to the present invention, the lithium cells can be resolved in safe way, and either the cell activated substances, or the electrolytic fluid can be brought into inert conditions at higher efficiencies. Also, the disposal treating fluids may be easily separated and collected, so that the valuable substances contained in the cell could be effectively recycled.

BRIEF DESCRIPTION OF THE DRAWINGS

FIG. 3 is a schematic diagram of a secondary battery treating apparatus, according to the present invention, in which two treating chambers are series-connected to three preparing chambers.

DESCRIPTION OF THE PREFERRED EMBODIMENTS

Embodiment 1

Figure 1:
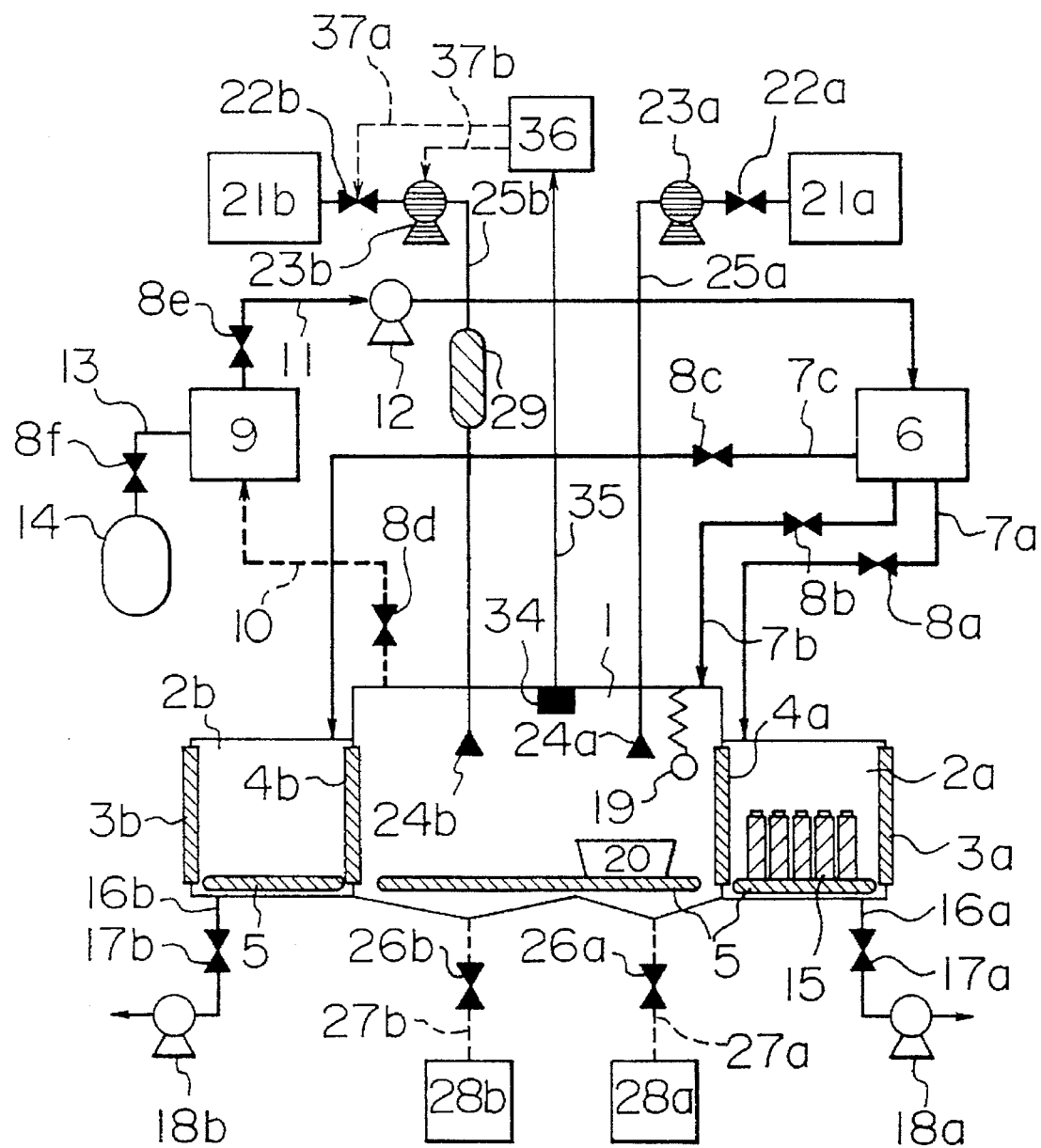
FIG. 1 is a schematic diagram of a secondary battery treating apparatus according to the present invention.

FIG. 1 is a cell treating apparatus where one treating chamber 1 is coupled to two preparing chambers 2a and 2b on both sides thereof, which corresponds to a basic construction of the present invention. Outer dimensions of the treating chamber 1 and the preparing chambers 2a, 2b are 1 m×1 m×2.5 m, and 0.5 m×0.5 m×1 m respectively. The preparing chambers 2a and 2b have switching plates 3a and 3b at outer sides thereof to maintain airtightness of the preparing chambers. There are also two sheets of switching plates 4a and 4b between the preparing chambers 2a, 2b and the treating chamber 1. To transport a cell, cell constructive parts and so on inside this treating apparatus, a belt conveyer 5 is installed. Three sets of gas supplying systems are connected to the treating chamber 1 and the preparing chambers 2a and 2b, which comprise a nitrogen gas storage vessel 6 having a function to dry gas, nitrogen gas supplying tubes 7a, 7b, 7c, and switching valves 8a, 8b, 8c. The treating chamber 1 is connected via a gas exhausting tube 10 with a gas separator 9, and the switching valve 8d is fixed to the gas exhausting tube 10. To return nitrogen gas collected by the gas separator 9 to the storage vessel 6, a transport tube 11, a gas transport pump 12, and a switching valve 8e are employed, and the gas generated in the treating chamber 1 during the cell treatment is separated by the gas separator 9, so that the generated gas is collected into a generated gas storage vessel 14 connected by a transport tube 13 having a switching valve 8f. When hydrogen gas is collected, a hydrogen absorbing alloy is put into the generated gas storage vessel 14. While the cell is treated, the switching valve 8b, the switching valve 8d, and the switching valve 8e are brought into opening states, and then the pump 12 is driven to circulate nitrogen. The cells to be treated in this embodiment 1 are five pieces of cylindrical type 3Wh lithium secondary batteries in which $LiCoO_2$ is employed as a positive electrode, an Li alloy is used as a negative electrode, and an organic electrolytic fluid into which $LiPF_6$ is solved is employed as electrolytic solution. First, these cylindrical type secondary batteries are completely discharged outside the cell treating apparatus. The switching plate 3a is opened to position the abovedescribed cells 15 into the preparing chamber 2a, and the switching plate 3a is closed. Next, a switching valve 17a mounted on the gas exhausting tube 16a is opened and an exhausting pump 18a is actuated to exhaust air present in the preparing chamber 2a. After the preparing chamber 2a becomes a vacuum, the switching valve 17a is closed and the pump 18a is stopped. Subsequently, dry nitrogen gas is supplied from the gas supplying tube 7a to the preparing chamber 2a. Thereafter, the switching plate 4a is opened to transport the cells 15 to the treating chamber 1, and a switching door 4a is closed. The vessels of the cells 15 are crashed within the treating chamber 1 by employing a cell crashing machine 19 having a hammer crusher, and the crashed articles are collected into a storage vessel 20 with a mesh provided on a bottom thereof. Hexane is used to clean the electrolytic fluid adhering to the crashed articles. A treating fluid storage vessel 21a for storing hexane is connected to the treating chamber 1 by way of a fluid supplying tube 25a equipped with a switching valve 22a, a pump 23a, and a sprayer 24a. Hexane is sprayed from the sprayer 24a toward the crashed articles stored in the storage vessel 20, thereby cleaning up the electrolytic fluid, and then the used cleaning fluid is stored into a disposal fluid storage vessel 28a via a fluid exhausting tube 27a mounted on the switching valve 26a. Thereafter, the storage vessel 20 was transported under the sprayer 24b. The switching valve 22b is opened to operate the pump 23b, and ethanol stored in the treating fluid storage vessel 21b was sprayed toward the crashed articles. When ethanol is added to the negative electrode, the lithium alloy was started to be decomposed and hydrogen gas was produced. Since a large amount of white lithium alcoholate was deposited on the surface of the negative electrode after approximately 25 minutes have passed, reaction velocity between the negative electrode and ethanol was decreased, and the rate of generating hydrogen gas was lowered up to 30 ml or less per minute. The generated hydrogen gas was exhausted via the gas exhausting tube 10 together with nitrogen gas until the gas separator 9. In the gas separator 9, nitrogen was collected and nitrogen gas was transported via the transport tube 11 to the gas storage vessel 6. The hydrogen gas was stored from the gas transport tube 13 into a hydrogen storage vessel 14 containing $LaNi_5$ by opening the switching valve 8f. Since the generation of hydrogen from the destroyed articles was not observed after ethanol had been added and approximately 45 minutes have passed, the disposal treating fluid was transported from the fluid exhausting tube 27b to the disposal treating fluid storage vessel 28b by opening the switching valve 26b. When the inside of the preparing chamber 2b is not filled with dry nitrogen, the gas present within the preparing chamber 2b was exhausted by way of a gas exhausting system equipped with a switching valve 17b, a pump 18b, and a gas exhausting tube 16b. After the switching valve 17b is closed, the switching valve 8c is opened to conduct dry nitrogen from the gas supplying tube 7c into the preparing chamber 2b. The storage vessel 20 for storing ethanol-treated crashed articles was transferred to the preparing chamber 2b after the preparing chamber 2b has been filled with dry nitrogen, and the switching plate 3b was opened after the switching plate 4b was closed, thereby taking out the crashed articles. With the above-described operations, total time required to treat 5 pieces of 3Wh lithium secondary batteries 15 was about 1.6 hours. The volume of the ethanol solution containing lithium ion, collected in the disposal treating fluid storage vessel 28b was 4.5 to 5 l. 80% of the lithium metal used in the lithium cells was collected by way of the electric refinery. 95% of $LiPF_6$ could be collected by vacuum-evaporating the hexane solution of $LiPF_6$ stored in the disposal treating fluid storage vessel 28a.

Embodiment 2

Five lithium secondary batteries with the above-described specification are prepared, and a heater 29 shown in FIG. 1 is energized, so that the cell treating time is shortened by utilizing the apparatus of FIG. 1. A treating fluid for the Li alloy negative electrode is ethanol and a treating fluid for collect the electrolyte solution is hexane. The cells are crashed by employing the battery crashing machine 19 comprising the hammer crasher in accordance with the same sequence as that of the embodiment 1, and the crashed cell parts are stored into the storage vessel 20. Hexane was supplied from the sprayer 24a to clean the crashed cell parts. The disposal cleaning fluid was stored in the vessel 28a. Subsequently, the storage vessel 20 was positioned just under the sprayer 24b. First, the heater is turned OFF, and ethanol 1.5 to 2 l at the room temperature was supplied from the sprayer 24b. Subsequently, the heater is turned ON, and ethanol 1 l at 50° C. was sprayed to the cell parts. The time required to execute the reaction becomes 25 to 30 minutes, and total treating time became approximately 1.3 hours, whereby about 20 minutes can be shortened. An amount of hydrogen absorbed by the hydrogen storage vessel during the treatment of the negative electrode is within a range from 50 ml to 150 ml per minute, and the negative electrodes could be continuously discomposed in accordance with the method of this embodiment.

Embodiment 3

Instead of the method for heating the ethanol treating fluid executed in the embodiment 2, the treating fluid is stirred so that the cell treating time can be shortened. With employment of the apparatus of FIG. 1, five lithium secondary batteries having the same specification as in the embodiment 1 were treated. The cells were crashed by the cell crashing machine 19 equipped with the hammer crusher in the treating chamber 1 in accordance with the same sequence as that of the embodiment 1, and the cell articles crashed by the cell crashing machine 19 were stored into the storage vessel 20 having the bottom. After the cell constructive parts and the cell vessels have been cleaned by hexane supplied from the treating fluid storage vessel 21a in a similar manner to that of the embodiment 1, ethanol 1 1 is sprayed from the sprayer 24b toward the crashed articles and ethanol is stored into the storage vessel 20. Alternatively, the sprayer 24b connected to the treating fluid supplying tube 25b is disconnected therefrom, and ethanol may directly flow from the end portion of the supplying tube 25b into the storage vessel 20. Next, a rotary type stirring machine (not shown) was inserted into the storage vessel 20 into which ethanol and the cell crashed articles had been entered, to stir ethanol. Although an amount of ethanol required to treat the cells was 1 1, decomposition time effected by ethanol was 35 to 40 minutes, so that the cell treating time could be shortened by stirring the treating fluid, as compared with that of the embodiment 1.

Embodiment 4

The switching valve 22b provided in the cell treating apparatus shown in FIG. 1 was replaced by a flow-rate controller 22b having a function to control a flow rate of a fluid, and the supply of the treating fluid during the cell treatment was automatically controlled. A sensor (hydrogen sensor) 34 having a function capable of detecting hydrogen concentration within the treating chamber 1 was installed in the treating chamber 1. The sensor 34 was connected via a signal input cable 35 to the calculation controller 36. The calculation controller 36, the flow rate controller 22b, and the treating fluid transport pump 23b were mutually connected by signal output cable 37a and 37b. The sensor 34 measures hydrogen concentration within the treating chamber 1, and transfers an electric signal directly proportional to the measurement value to the calculation controller 36. The calculation controller 36 calculates the electric signal sent from the sensor 34, and transfers an electric signal produced in accordance with this calculation result to either the flow rate controller 22b, or the treating fluid transport pump 23b, thereby controlling these operations. In this embodiment, the calculation processing conditions have been set in such a manner that the calculation controller is operable as follows:

(1) When the electric signal transferred from the hydrogen sensor suddenly exceeds the above-described set value, the flow rate controller 22b is closed via the signal output cables 37b and 37a to stop the treating fluid transport pump 23b, thereby interrupting the supply of the fluid. An upper limit value of hydrogen concentration set in this embodiment is a value corresponding to hydrogen concentration equal to a hydrogen generating amount of 200 ml per minute.

(2) When hydrogen concentration within the treating chamber 1 is gradually increased, the electric signal is set to the signal output cable 37b to control the flow rate controller 22b, so that the flow rate of the treating fluid is reduced. Conversely, when hydrogen concentration is low, the flow rate of the treating fluid is increased. In this embodiment, the flow rate of the treating fluid to be supplied was linearly increased/decreased within a range of 50 to 0 ml per minute under such a condition that the hydrogen generating speed corresponds to hydrogen concentration of 0 to 200 ml per minute.

Under the above-described conditions, the five lithium secondary cells having the same specification as in the embodiment 1 were treated by employing the apparatus of FIG. 1, and the amount of ethanol supplied from the treating fluid storage vessel 21b was 4 1. 1.4 to 1.5 hours were needed since the cells were entered into the treating apparatus and then the treated crashed articles and the treated parts were derived from the treating apparatus. In accordance with this embodiment, the cell treating time could be shortened and the amount of the used treating fluid could be lowered, as compared with the embodiment 1, and also the cell treatment may be automatically performed without any man power.

Embodiment 5

As the sensor 34 of the cell treating apparatus shown in FIG. 1, either a temperature sensor, or an infrared sensor having a function capable of sensing infrared rays was mounted, and five cylindrical type lithium secondary batteries having the same specification as in the embodiment 1 were treated. Other than the used sensor, the switching valve 22b shown in FIG. 1 was replaced by a treating fluid flow-rate adjuster 22b in the cell treating apparatus employed in this embodiment. An internal temperature of the treating chamber 1 is measured by the sensor 34 (temperature sensor), and an electric signal directly proportional to the measurement value is transferred to the calculation controller 36. The sensor monitors infrared rays existing in the storage vessel 20 for storing the negative electrodes of the crashed cells and around the storage vessel 20, and transfers an electric signal directly proportional to intensity of infrared rays to the calculation controller 36. The calculation controller 36 executes a calculation process in response to the electric signal sent from the sensor 34. For example, when the temperature sensor is employed, if the internal temperature of the treating chamber 1 is increased within the range from the room temperature to 40° C., then the calculation controller 36 transfers the electric signal via the cable 37a to the flow rate controller 22b in order to lower the flow speed of the treating fluid stored in the treating fluid storage vessel 21b from 50 ml per minute to 0 ml per minute. If the internal temperature of the chamber 1 exceeds 40° C., the controller 36 performs to close the flow rate controller 22b and to transfer the electric signal via the cable 37b to the pumps 23b in order to stop the pump 23b. When the infrared sensor is utilized, when intensity of infrared rays existing around the storage vessel 20 is increased, the flow rate controller 22b is controlled, as previously stated, to increase/decrease the flow speed of the treating fluid.

With employment of the cell treating apparatus of FIG. 1 comprising the temperature sensor, when the above-described lithium cells were treated, the supply control of the treating fluid sharply sensitive to the temperature changes during the cell treatment could be performed in response to local heating during the cell treatment if the infrared sensor is employed.

Embodiment 6

Figure 2:
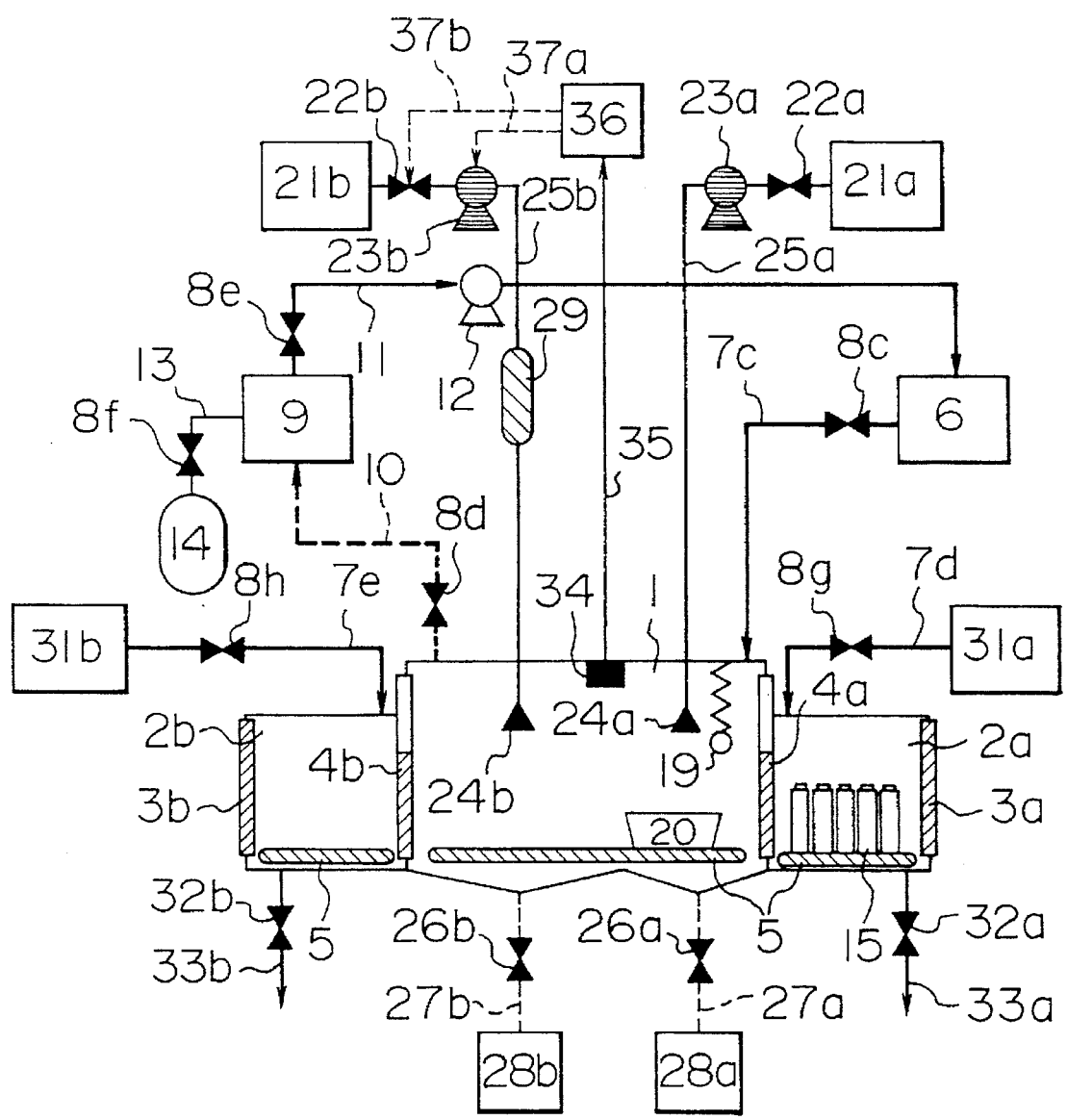
FIG. 2 is a schematic diagram of a secondary battery treating apparatus comprising a slide type switching plate.

FIG. 2 is a cell treating apparatus in which the switching plates 4a and 4b of FIG. 1 have been substituted by transfer ports 4a and 4b comprising slide type switching plates, respectively, in order to shorten cell treating time, as compared with that of the embodiment 1. In this apparatus, dry air is used in the gas storage vessel 6, so that the dry air could be continuously supplied to the treating chamber 1. When the switching plate 3a is opened, the dry air is blown from the gas supplying vessel 31a into the preparing chamber, and then is passed through the gas exhausting tube 33a while the switching valve 32a is being opened, whereby wet air existing outside the apparatus could be hardly mixed with the dry air in the treating chamber 1. Also, when the treated cell constructive parts were derived from the preparing chamber 2b, the dry air was blown from the gas supply vessel 31b into the preparing chamber 2b, and was passed through the gas exhausting tube 33b, while the switching valve 32b is being opened. Five lithium secondary batteries with the same specification as in the embodiment 1 were prepared and treated by employing the heater 29 in a similar manner to that of the embodiment 2. The time required to treat the negative electrodes by way of ethanol was 25 to 30 minutes similar to that of the embodiment 2, and there was no change in the crashing time of the cells. Since gas substitutions of the preparing chambers 2a and 2b were no longer required in this embodiment, the overall treatment time could be shorted to become 1 hour.

Embodiment 7

Five pieces of cylindrical type 3Wh lithium secondary batteries in which $V_6O_{13}$ is used as a positive electrode, a Li metal is used as a negative electrode, and $LiCF_3SO_3$ is mixed with polyethylene oxide as solid polymer electrolyte, were treated by utilizing the cell treating apparatus of FIG. 1. The lithium secondary batteries with using the above-explained solid polymer electrolyte were crashed within the treating chamber 1 of FIG. 1, and the crashed articles were stored into the storage vessel 20. In this embodiment, the crashed articles were not washed by hexane, but were directly transported under the sprayer 24b. Subsequently, ethanol supplied from the treating fluid storage vessel 21b was sprayed toward the crashed articles to decompose the Li metal contained in the crashed articles. In accordance with this embodiment, ethanol was consumed by 4 l to treat the Li metal of the negative electrodes, and the treating time was 1.2 to 1.3 hours.

Embodiment 8

FIG. 3 is a cell treating apparatus in which two treating chambers 1a and 1b are alternately coupled to three preparing chambers 2a, 2b and 2c. Outer dimensions of the treating chambers 1a and 1b are 1 m×1 m×2.5 m, respectively, and outer dimensions of the preparing chambers 2a, 2b, 2c are 0.5 m×0.5 m×1 m, respectively. Switching plates 3a and 3b are provided outside the preparing chambers 2a and 2c to maintain airtightness of the preparing chambers. Four switching plates 4a, 4b, 4c, 4d are located at portions where the treating chambers are in contact with the preparing chambers. This apparatus is equipped with a nitrogen gas storage vessel 6 having a function to dry gas, and supplies dry nitrogen to the respective treating chambers and preparing chambers. Gas supplying tubes for feeding dry nitrogen to the treating chambers 1a, 1b, and the preparing chambers 2a, 2b, 2c, are 7b, 7d, 7a, 7c, 7e. Switching valves 8b, 8d, 8a, 8c, and 8e were mounted on the respective supply tubes. The treating chambers 1a, 1b and a gas separator 9 were mutually connected to each other by gas exhausting tubes 10a and 10b, and a switching valve 8g or a switching valve 8h was mounted on the halfway of each gas exhausting tube. The gas generated in the treating chambers 1a and 1b during the cell treatment and the nitrogen gas are separated from each other by the gas separator 9. The nitrogen gas collected by the gas separator 9 is returned to the storage vessel 6, and a transport tube 11, a gas transport pump 12, and a switching valve 8e were provided. The generated gas which had been separated was collected by a generated gas storage vessel 14 connected by a transport tube 13 having a switching valve 8f. When hydrogen gas is collected, an $LaNi_5$ hydrogen absorbing alloy is entered into the generated gas storage vessel 14. While the cells are treated by the treating fluid, either the switching valve 8b of the gas supplying tube or the switching valve 8d thereof connected to either the treating chamber 1a, or the treating chamber 1b under operation, is opened, and furthermore the switching valve 8e is opened, and also the pump 12 is driven to circulate nitrogen.

The cells treated in this embodiment are five rectangular type 30Wh lithium secondary batteries each having the dimension of 50 mm×80 mm×40 mm, in which $LiCoO_2$ is used as the positive electrode, an Li alloy is used as the negative electrode, and organic electrolytic solution in which $LiPF_6$ is dissolved is used as the electrolyte. A stainless expand metal having a thickness of 0.1 mm was used as a holder. These cells are completely discharged outside the cell treating apparatus, and the switching plate 3a is opened to position the cells into the preparing chamber 2a. The pump 18a is driven to exhaust air existing in the preparing chamber from the gas exhausting tube 16a. Next, after the switching valve 17a is closed, the switching valve 8a is opened to conduct nitrogen gas into the preparing chamber 2a. The switching plate 4a is opened, and the cells 15 are positioned under the cell crashing machine 19 equipped with the diamond cutter. Here, the diamond cutter of the cell crashing machine 19 is operated to cut off the upper portions of the cell vessels, to which the electrode terminals are attached. The upper portions of the cut cell vessels are taken out and then the cell constructive members are derived from the cut cell vessels. Hexane is sprayed by the sprayer 24a from the treating fluid storage vessel 21a for storing therein hexane via the switching valve 22a, and the treating fluid transport pump 23a, whereby the electrodes, the separators and the inside portions of the cell vessels, into which the electrolytic fluids have been absorbed, are cleaned. After the cleaning operation is carried out, the negative electrodes are cut into small components by way of the rotary type cutter mixer, and these small components are stored into the storage vessel 20 with the bottom on which a mesh is mounted, and also both the cell vessels and the cell constructive components other than the negative electrodes are positioned on the belt conveyer 5 near the storage vessel 20. The disposal cleaning fluid is stored into the disposal treating fluid storage vessel 28a by opening the switching valve 26b. The treating fluids used in the treating chamber 1a are 1-propanol and ethanol, which are stored into the treating fluid storage vessels 21b and 21c, respectively. A mixing ratio of 1-propanol to ethanol is controlled by adjusting the switching valves 22b and 22c having the flow-rate adjusting functions. The treating fluids are supplied by the pump 23b from the sprayer 24b via the treating fluid supplying tube 25b into the treating chamber 1a. First, the switching valve 22c connected to the ethanol storage vessel 21c is closed, and the switching valve 22b is opened to spray 1-propanol from the 1-propanol storage vessel 21b by the sprayer 24b, so that the lithium alloy in the negative electrodes stored in the storage vessel 20 is treated. Subsequently, the switching valve 22c of the ethanol storage vessel 21c is gradually opened, and at the same time, the switching valve 22b of the 1-propanol storage vessel 21b is gradually closed, so that ethanol concentration within the treating fluid is increased. The switching valve 22b is completely closed, and only ethanol is supplied from the treating fluid storage vessel 21c to furthermore treat the negative electrodes. In this case, 1-propanol was used by 3 l and ethanol was used by 4 l, and also the treating time was 1.5 hours.

With employment of the nitrogen gas supplying system constructed of the switching valve 8c and the gas supplying tube 7c, and also the gas exhausting system constructed of the switching valve 17b, the pump 18b, and the gas exhausting tube 16b, the inside of the preparing chamber 2b is brought into a dry nitrogen atmosphere in a similar manner to the preparing chamber 2a. Thereafter, the switching plate 4b is opened to transport the storage vessel 20 for storing the negative electrodes and other cell constructive components to the treating chamber 2b. Subsequently, the switching plate 4b is closed and the switching plate 4c is opened, whereby both the storage vessel 20 for storing the negative electrodes and the other cell constructive components are moved just under the sprayer 24c. The ethanol solution containing 10% of water is conducted from the treating fluid storage vessel 21d into the treating chamber 1b, so that the lithium alloy contained in the negative electrode is completely brought into the inert state. The treating fluid used in the treating chamber 1b was 2 l and the treating time was 0.7 hours. After the treatment has been accomplished, the inside of the preparing chamber 2c is brought into a dry nitrogen atmosphere by employing the nitrogen gas supplying system constructed of the switching valve 8e and the gas supplying tube 7e, and also the gas exhausting system constructed of the pump 18c and the gas exhausting tube 16c in a similar manner to that of the preparing chamber 2a. Thereafter, the storage vessel 20 for storing the negative electrodes and the cell parts other than the negative electrodes are taken out from the preparing chamber 2c.

By the above-described operations, the treatment time of the five 30 Wh lithium secondary batteries was approximately 3.5 to 3.8 hours. The entire volumes of 1-propanol and ethanol required to treat the negative electrodes were 3 l and 6 l, respectively. As a result, even such a cell having an energy capacity 10 times higher than that of the lithium cells treated in FIG. 1 and FIG. 2, could be effectively treated as the inert conditions by utilizing the cell treating apparatus according to this embodiment. The disposal treating fluids are stored from the respective treating chambers into the separate vessels, and then lithium of 60% and lithium of 30% could be collected from the respective proposal treating fluid storage vessels 28b and 28c. As described above, cost of the condensing steps for the disposal fluids may be reduced by selecting the cell treating fluids which are to be reproduced.

Figure 4:
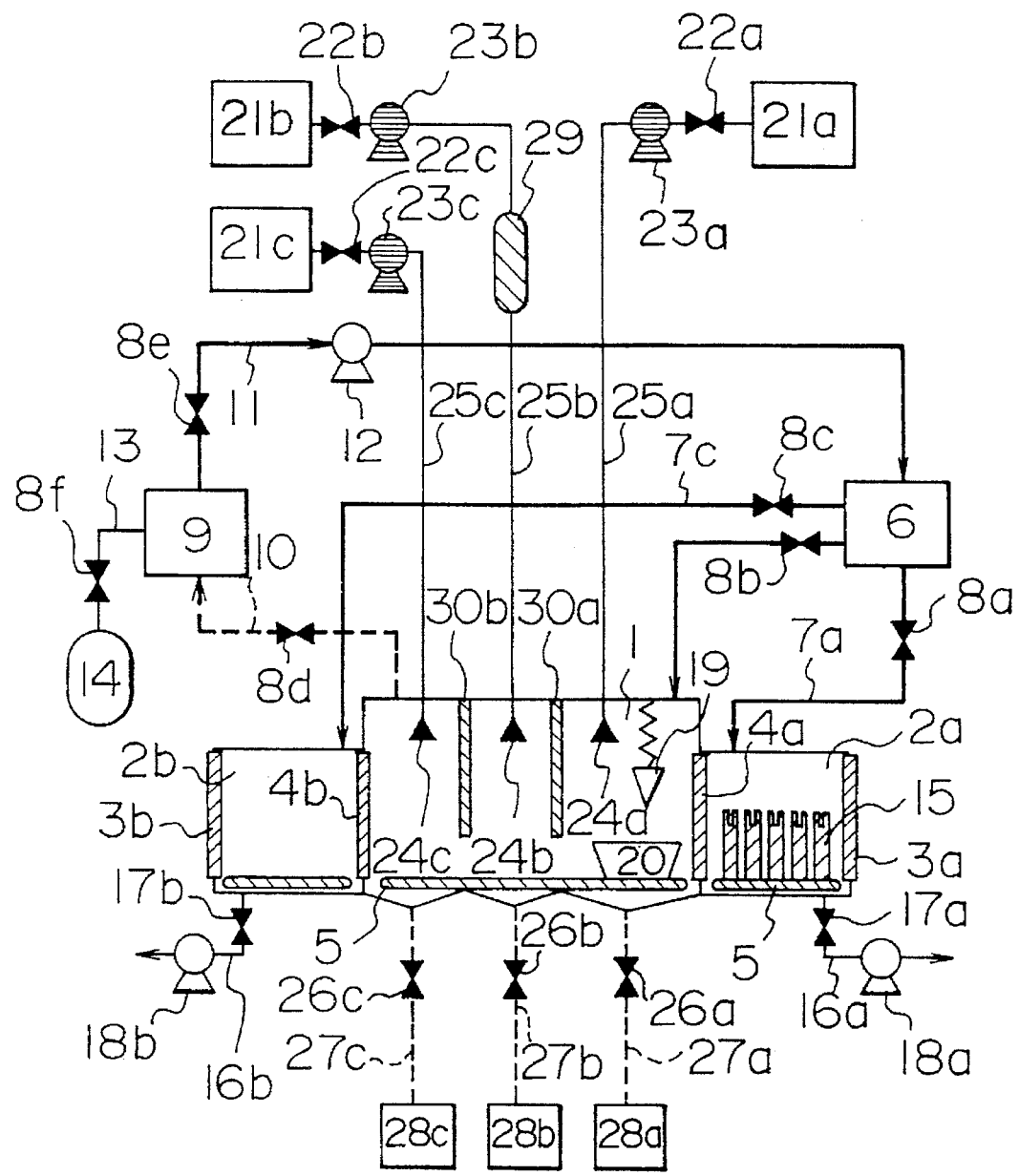
FIG. 4 is a schematic diagram of a secondary battery treating apparatus, according to the present invention, in which a single treating chamber is segmented by two compartment plates.

FIG. 4 is a cell treating apparatus where three sets of independent treating fluid supplying systems and an exhausting system are installed to the apparatus of FIG. 1. Two sheets of compartment plates 30a and 30b are provided on the upper portion of the treating chamber 1 to reserve three treating-fluid supplying regions. Three disposal treating-fluid exhausting tubes 27a, 27b, 27c capable of independently collecting the treating fluids which have been used in the comported regions, were mounted. A switching valve 26a and a switching valve 26b were mounted on these exhausting tubes, respectively. Hexane used as an electrolytic fluid cleaning purpose is stored into the treating fluid storage vessel 21, and both ethanol for decomposing the negative electrode and ethanol containing water of 10 wt % for decomposing the negative electrode are stored into the treating fluid storage into the treating fluid storage vessels 21b and 21c, respectively. Dry nitrogen gas to be supplied to the treating chamber 1 and the preparing chambers 2a and 2b, was conducted from the gas storage vessel 6 into the apparatus. Lithium cells handled in this embodiment are 5 pieces of rectangular 30 Wh lithium secondary batteries with the dimension of 50 mm×80 mm×40 mm, having the same specification as in the embodiment 8. First, the cells 15 were completely discharged outside the cell treating apparatus of FIG. 4, and the resultant cells 15 were transported inside the treating chamber 1 in accordance with the same sequence as in the embodiment 1, and then positioned at centers of the compartment plate 30a and the switching plate 4a. Here, the upper portions of the cell vessels are cut out by employing the cell crashing machine 19 equipped with the diamond cutter to remove the upper vessels of the cells, so that the cell constructive members are taken out. The electrolytic fluid attached to the separators, cell vessels and electrodes was washed away by supplying hexane from the sprayer 24a. The disposal cleaning fluid was stored from the fluid exhausting tube 27a into the treating fluid storage vessel 28a. The cleaned negative electrodes were cut into small components by utilizing the rotary type cutter mixer, and the resulting small components were stored into the storage vessel 20 with the bottom on which a mesh is provided. Other cell members are kept on the belt conveyer 5. The belt conveyer 5 is driven to move the storage vessel 20 just under the sprayer 24b, so that ethanol present in the treating fluid storage vessel 21b is sprayed from the sprayer 24b. During the treatment, the heater 29 was not operated and ethanol was not heated. The supplying amount of ethanol was 5 l and the treatment time required 1.2 hour in this step. After approximately 0.7 hour has passed from the commencement of the treatment, white lithium alcoholate was deposited and the hydrogen generating speed became delayed. Next, both the storage vessel 20 for storing therein the negative electrodes and other cell components were put on the belt conveyer 5 and transported under the sprayer 24c. Here, an ethanol mixture fluid containing water of 10 wt % was sprayed from the treating fluid storage vessel 21c to the negative electrodes. The alloy which is contained in the negative electrodes and has not yet been reacted, was again started to be decomposed, so that it could be observed that hydrogen gas was produced. The volume of the treating fluid used in this operation was 2 l and the treatment time was 0.5 hours. Next, after the atmosphere of the preparing chamber 2b had been changed into dry nitrogen atmosphere, the switching plate 4b was opened to move the storage vessel 20 and the electrode members to the preparing chamber 2b. Subsequently, after the switching plate 4b was closed and the switching plate 3b was opened, all of the treated cell members were derived. The time required to bring the negative electrodes of the five 10 Wh lithium secondary cells into the inert condition was 2.7 to 2.8 hours, which were shorter than that the embodiment 7. The overall volume of ethanol required to process the negative electrodes was approximately 7 l. Since the amount of hydrogen generated in all treatment steps was at the most 100 to 170 ml per minute, the large-sized lithium cells could be treated under safety condition by employing the apparatus of FIG. 4. The disposal fluids stored in the disposal treating fluid storage vessel 28a was vacuum-evaporated, so that 95% of the total amount of $LiPF_6$ contained in the five cells could be collected. The disposal fluids obtained from the vessels 28b and 28c were evaporated, and 87% of lithium contained in all of the cells which was treated by the electric refinery could be collected. The lithium collecting ratios were 55% for the vessel 28b and 32% for the vessel 28c. In accordance with the present embodiment, when even such cells having the energy capacity 10 times higher than that of the lithium secondary cells treated in FIG. 1 and FIG. 2 were continuously treated by the cell treating apparatus of FIG. 4, the treatment time per a single cell could be shortened, and hydrogen produced during the cell treatment could also be collected into the generated gas storage vessel 14 into which the $LaNi_5$ alloy has been entered, so that safety conditions of the cell treatment could be maintained. Since the disposal treating fluids could be stored from the respective treating chambers into the respective tanks, the evaporating steps of the vessel 28b could be made simple, and also cost of the condensing steps for the disposal fluids could be reduced by separately collecting the disposal fluids.

With employment of the cell treating method and the cell treating apparatus, according to the present invention, the lithium cells can be effectively treated under safety conditions, and also the valuable substances including lithium contained in the cells can be collected.

What is claimed is:

1. A method for treating a plurality of cells each cell comprising an electrode containing lithium and an electrolyte solution, said method comprising:

a first step of exposing the electrodes containing lithium in the cells;

a second step of treating the exposed electrodes and the cells with a cleaning solution for removing the electrolyte solution from the electrodes and from said cells;

a third step of treating the exposed and cleaned electrodes with a first treating liquid reactive with the lithium in said electrodes to form reaction products on surfaces of said electrodes;

a fourth step of treating said electrodes having reaction products formed thereon with a second treating liquid more reactive with the lithium in said electrodes than said first treating liquid to remove the reaction products from said electrodes;

a fifth step of recovering the cleaning solution, the first treating liquid and the second treating liquid after each of the second, third and fourth steps, separately from each other; and a sixth step of separating the electrodes treated with the second treating liquid from said cells.

2. A method for treating a cell comprising an electrode containing lithium, which comprises the steps of:

a first step of exposing said electrode in the cell;

a second step for contacting said exposed electrode under a first condition with a first treating fluid reactive to said lithium in said electrode to deposit a reaction product on a surface of said electrode; and a third step for contacting said electrode treated with said first treating fluid under a second condition with a second treating fluid reactive to said lithium in said electrodes and capable of removing said reaction product from said surface; said cell also contains an electrolyte solution, said method further comprising a step of separating the electrolyte solution from said cell before said second step and a step of collecting said electrolyte solution thus separated.

3. A method according to claim 2, wherein electrolyte solution is separated by dipping said cell into a cleaning solution which is inactive to said lithium and said electrolyte.

4. A method according to claim 2, wherein electrolytic solution is separated by supplying said cell with a cleaning solution which is inactive to said lithium and said electrolyte.

5. A method for treating a cell comprising an electrode containing lithium, which comprises the steps of:

a first step of exposing said electrode in the cell;

a second step for contacting said exposed electrode under a first condition with a first treating fluid reactive to said lithium in said electrode to deposit a reaction product on a surface of said electrode; and a third step for contacting said electrode treated with said first treating fluid under a second condition with a second treating fluid reactive to said lithium in said electrodes and capable of removing said reaction product from said surface; said first treating fluid comprising an alcohol and said second treating fluid comprising a mixture of said alcohol and water.

6. A method according to claim 5, further comprising a step of monitoring gas concentration and a step of controlling mixing ratio of said alcohol and water in said mixture to keep said $H_2$ concentration thus monitored lower than a predetermined concentration.

7. A method for treating a cell comprising an electrode containing lithium, which comprises the steps of:

a first step of exposing said electrode in the cell;

a second step for contacting said exposed electrode under a first condition with a first treating fluid reactive to said lithium in said electrode to deposit a reaction product on a surface of said electrode; and a third step for contacting said electrode treated with said first treating fluid under a second condition with a second treating fluid reactive to said lithium in said electrodes and capable of removing said reaction product from said surface; a temperature of said first condition being lower than a temperature of said second condition.

8. A method for treating a cell comprising an electrode containing lithium, which comprises the steps of:

a first step of exposing said electrode in the cell;

a second step for contacting said exposed electrode under a first condition with a first treating fluid reactive to said lithium in said electrode to deposit a reaction product on a surface of said electrode; and a third step for contacting said electrode treated with said first treating fluid under a second condition with a second treating fluid reactive to said lithium in said electrodes and capable of removing said reaction product from said surface; said method further comprising between said second and third steps, a step of cleaning said reaction product deposited on said surface of said electrode.

9. A method for treating a cell comprising an electrode containing lithium, which comprises the steps of:

a first step of exposing said electrode in the cell;

a second step for contacting said exposed electrode under a first condition with a first treating fluid reactive to said lithium in said electrode to deposit a reaction product on a surface of said electrode; and a third step for contacting said electrode treated with said first treating fluid under a second condition with a second treating fluid reactive to said lithium in said electrodes and capable of removing said reaction product from said surface; said first treating fluid and said second treating fluid being each stirred in said second and third steps, respectively.

10. A method for treating a cell comprising an electrode containing lithium, which comprises the steps of:

a first step of exposing said electrode in the cell;

a second step for contacting said exposed electrode under a first condition with a first treating fluid reactive to said lithium in said electrode to deposit a reaction product on a surface of said electrode; and a third step for contacting said electrode treated with said first treating fluid under a second condition with a second treating fluid reactive to said lithium in said electrodes and capable of removing said reaction product from said surface; said first treating fluid and second treating fluid being controlled in flow rate and/or in composition to keep a reaction rate lower than a predetermined rate based upon at least one of information relating to temperature, heating amount, infrared intensity, gas compositions, and pressure existing during said respective first and second conditions.

11. A method for treating a cell comprising an electrode containing lithium, which comprises the steps of:

a first step of exposing said electrode in the cell;

a second step for contacting said exposed electrode under a first condition with a first treating fluid reactive to said lithium in said electrode to deposit a reaction product on a surface of said electrode; and a third step for contacting said electrode treated with said first treating fluid under a second condition with a second treating fluid reactive to said lithium in said electrodes and capable of removing said reaction product from said surface; said first, second and third steps being carried out in an inert gas atmosphere or in a dry gas atmosphere having a lower moisture content than that of ambient air and said inert gas atmosphere or said dry gas atmosphere being controlled in flow rate thereof based upon at least one of information relating to temperature, a heating amount, infrared intensity, gas compositions, and pressure existing during said respective first and second conditions.

12. A method for treating a cell having a negative electrode containing lithium comprising:

a first step of exposing the negative electrode containing lithium;

a second step of treating said electrode thus exposed with a first treating reagent which is reactive to said lithium in said electrode; and a third step of treating said electrode thus treated with said first treating reagent with a second treating reagent more reactive to said lithium in said electrode than said first treating reagent, wherein said first treating reagent comprises an alcohol and said second treating reagent comprises a mixture of said alcohol and water.

13. A method according to claim 12, further comprising a step of monitoring $H_2$ gas concentration and a step of controlling a mixing ratio of said alcohol and water in said mixture to keep said $H_2$ concentration thus monitored lower than a predetermined concentration.

14. A method for treating a cell having a negative electrode containing lithium comprising:

a first step of exposing the negative electrode containing lithium;

a second step of treating said electrode thus exposed with a first treating reagent which is reactive to said lithium in said electrode; and a third step of treating said electrode thus treated with said first treating reagent with a second treating reagent more reactive to said lithium in said electrode than said first treating reagent, wherein said first and second treating reagents are stirred in said second and third steps, respectively.

15. A method for treating a cell having a negative electrode containing lithium comprising:

a first step of exposing the negative electrode containing lithium;

a second step of treating said electrode thus exposed with a first treating reagent which is reactive to said lithium in said electrode; and a third step of treating said electrode thus treated with said first treating reagent with a second treating reagent more reactive to said lithium in said electrode than said first treating reagent, wherein said temperature of said first treating reagent is higher than a temperature of said second treating reagent.

16. A method for treating a cell having a negative electrode containing lithium comprising:

a first step of exposing the negative electrode containing lithium;

a second step of treating said electrode thus exposed with a first treating reagent which is reactive to said lithium in said electrode; and a third step of treating said electrode thus treated with said first treating reagent with a second treating reagent more reactive to said lithium in said electrode than said first treating reagent, wherein said electrode is also heated in the third step.

* * * * *